May 28, 1929.  J. M. REDINGER  1,715,097
MILLING CUTTER
Filed March 11, 1927
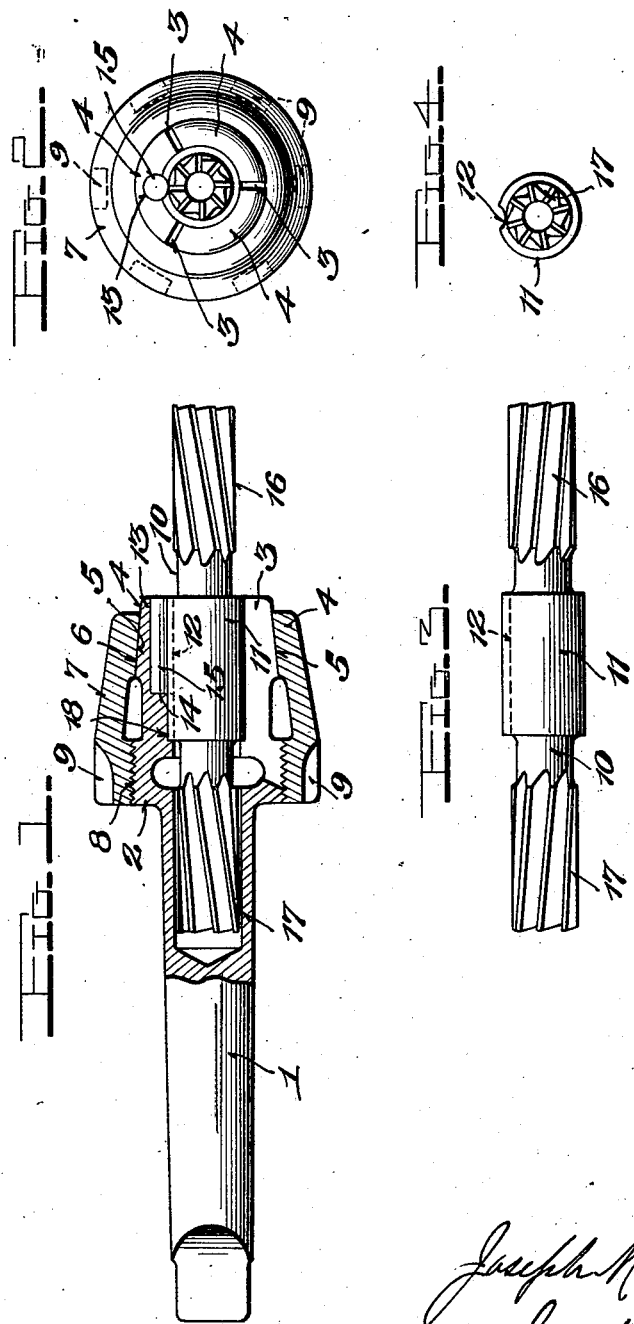
Inventor
Joseph M. Redinger
By Joseph A. Miller
Attorney Patented May 28, 1929.

1,715,097

UNITED STATES PATENT OFFICE.

JOSEPH M. REDINGER, OF PROVIDENCE, RHODE ISLAND.

MILLING CUTTER.

Application filed March 11, 1927. Serial No. 174,672.

This invention relates to certain new and useful improvements in milling cutters, and relates more particularly to improved means for holding the cutter.

The primary object of the invention is to provide a cutter, and especially one of the double-ended type, which enables either end to be employed by the use of simple and positive holding means, the holding means functioning identically regardless of which end of the cutter is being employed.

A further object of the invention is to provide means of this type which is of economical construction and which permits the cutter to be easily and quickly applied to and removed from the holder or chuck.

In the drawings:

Fig. 1 is a view partly in longitudinal section and side elevation of the invention;

Fig. 2 is a front end elevation of Fig. 1;

Fig. 3 is a side elevation of the cutter per se, and

Fig. 4 is an end view of Fig. 3.

In proceeding in accordance with the present invention, a holder is employed having the usual shank 1, which latter at its outer end is formed with a head 2 longitudinally slotted at 3 to provide a series of resilient jaws or members 4 having tapered outer faces 5 which are engaged by a continuous conical wall 6 formed on a chuck sleeve 7. The head 1 is threaded at 8 and sleeve 7 is correspondingly threaded so as to engage with the threads 8. The sleeve 7 is formed with a series of cutouts 9 so as to enable the latter to be gripped by a wrench and rotated. The cutter is composed of a shank 10 having a central portion 11 of uniform diameter throughout, the portion 11 being formed with a longitudinal or axial cut-out or groove 12 which forms a keyway. The keyway extends through the ends of the central portion 11 as shown in Figs. 1 and 2. One of the members 4 of the chuck is formed with a groove 13 which extends through its outer end and which terminates intermediate the ends of the member 4 to provide a shoulder 14, a pin 15 preferably of circular cross-section being received in the groove 13 and also in the groove 12 of the cutter and abuts the shoulder 14. It will be noted that the opening 13 in which the pin 15 is received is of less width at its inner portion than at its greater diameter, so that when the pin 15 is inserted in the opening 13, the pin cannot drop out of the opening, but can only be removed by longitudinally sliding the same through the front end of the opening 13. Cutters 16 and 17 which may be of identical or varying form are provided on the opposite ends of the shank 10 and one of the same is received in an opening 17 provided therefor in the shank 1.

From the foregoing, it will be seen that in securing the cutter in position, the pin 15 is first placed in its opening, and the jaws 4 are permitted to expand, by moving the gripping sleeve 7 forwardly. The cutter is then inserted in position and its groove 12 brought into register with the pin, whereupon the cutter is slid into the position shown in Fig. 1.

The gripping sleeve 7 is then rotated rearwardly and due to the tapering faces 5 and 6, the jaws 4 will be moved inwardly to firmly engage the pin 15 in groove 12, thus positively and securely locking the parts so as to prevent rotation of the cutters with respect to the head, or in other words, positively locking the parts so that the cutter is compelled to rotate with the head.

In removing the parts, the reversed operation is had, namely the sleeve 7 is moved forwardly to permit the jaws to expand whereupon the cutter is slid outwardly. Due to the inner end of the pin 15 projecting into the bore 18 of the head which receives the central portion 11 of the cutter, it will be seen that a hook can be inserted in the bore 18 and engaged with the inner end of the pin 15 so as to remove the latter, should the same stick in the opening 13.

Having thus described my invention what I claim as new and desire to secure by Letters Patent is:—

In combination with a cutter having an intermediate enlarged part and having a longitudinal groove in its periphery extending through the ends of the enlarged part, a holder having a bore to receive an end of the cutter and having jaws engageable with the enlarged part, one of the jaws being formed with a longitudinal groove which extends through the outer end thereof and which communicates with the first named groove and which has an inner end wall, a pin in the second groove abutting said end wall thereof at one end and having its opposite end flush with the outer end of said jaw and receivable in the first groove, and means to move the jaws thereby to hold the pin in the first groove, the second groove being of less width at the side thereof which communicates with the first named groove than the diameter of the pin so as to cause the pin to project into the holder bore and to prevent lateral movement of the pin and to enable the pin to be removed solely by longitudinal sliding thereof.

In testimony whereof I have hereunto set my hand and signed my name to this specification.

JOSEPH M. REDINGER.